(12) United States Patent
Knight et al.

(10) Patent No.: US 11,067,430 B2
(45) Date of Patent: Jul. 20, 2021

(54) SYSTEM AND A METHOD FOR ASCERTAINING THE MASS OF AT LEAST ONE ANIMAL

(71) Applicant: Somark Group Limited, Sydney (AU)

(72) Inventors: Adrian Knight, Sydney (AU); Paul Donohoe, Sydney (AU)

(73) Assignee: Somark Group Limited, Sydney (AU)

( * ) Notice: Subject to any disclaimer, the term of this patent is extended or adjusted under 35 U.S.C. 154(b) by 53 days.

(21) Appl. No.: 16/077,727

(22) PCT Filed: Feb. 11, 2017

(86) PCT No.: PCT/AU2017/050115
§ 371 (c)(1),
(2) Date: Aug. 13, 2018

(87) PCT Pub. No.: WO2017/136896
PCT Pub. Date: Aug. 17, 2017

(65) Prior Publication Data
US 2019/0391002 A1 Dec. 26, 2019

Related U.S. Application Data

(60) Provisional application No. 62/414,148, filed on Oct. 28, 2016, provisional application No. 62/294,084, filed on Feb. 11, 2016.

(51) Int. Cl.
*G01G 17/08* (2006.01)
*A01K 1/03* (2006.01)
(Continued)

(52) U.S. Cl.
CPC ............. *G01G 17/08* (2013.01); *A01K 1/031* (2013.01); *A01K 11/006* (2013.01); *G01G 3/00* (2013.01);
(Continued)

(58) Field of Classification Search
CPC ........ G01G 17/00; G01G 17/08; G01G 19/52; A01K 1/02; A01K 1/0209; A01K 1/0236;
(Continued)

(56) References Cited

U.S. PATENT DOCUMENTS 4,223,674 A 9/1980 Fluent et al.
4,262,632 A 4/1981 Hanton et al.
(Continued)

FOREIGN PATENT DOCUMENTS

EP 0 364 044 A1 4/1990
GB 2468587 A 9/2010
(Continued)

*Primary Examiner* — Suezu Ellis
(74) *Attorney, Agent, or Firm* — Patterson Thuente Pedersen, P.A.

(57) ABSTRACT

A system for ascertaining the mass of an animal having attached thereto a radio frequency identification (RFID) tag. The system comprises a scale for supporting the animal and generating mass information indicative of the mass of the animal when so supported. The system comprises a RFID reader for interrogating the RFID tag which when interrogated generates a RFID tag signal from which the RFID reader can derive animal identification information indicative of the identity of the animal.

11 Claims, 4 Drawing Sheets

(51) Int. Cl.
- *G01G 3/00* (2006.01)
- *G06K 7/10* (2006.01)
- *G06K 19/07* (2006.01)
- *A01K 11/00* (2006.01)

(52) U.S. Cl.
CPC ..... *G06K 7/10366* (2013.01); *G06K 19/0723* (2013.01)

(58) Field of Classification Search
CPC ........ A01K 1/0245; A01K 1/03; A01K 1/031; A01K 1/032; A01K 11/006; A01K 29/00; G06K 7/10366; G06K 19/0723
USPC ........ 235/375, 492; 119/842, 452, 453, 474, 119/482, 489, 491, 496, 498, 504, 119/511–513, 519; 340/573.1, 573.2
See application file for complete search history.

(56) References Cited

U.S. PATENT DOCUMENTS

| | | | |
|---|---|---|---|
| 5,053,774 A | 10/1991 | Schuermann et al. | |
| 5,211,129 A | 5/1993 | Taylor et al. | |
| 5,673,647 A * | 10/1997 | Pratt | A01K 5/02 119/51.02 |
| 5,816,197 A | 10/1998 | DeStefano et al. | |
| 2002/0154065 A1 | 10/2002 | Mejia et al. | |
| 2004/0260270 A1 | 12/2004 | Cohen | |
| 2006/0071782 A1 * | 4/2006 | Ahmed | G01S 13/825 340/539.13 |
| 2006/0071785 A1 | 4/2006 | Ahmed et al. | |
| 2007/0272157 A1 * | 11/2007 | Uner | A01K 1/126 119/14.04 |
| 2007/0288249 A1 * | 12/2007 | Rowe | A01K 1/0023 705/7.11 |
| 2008/0008357 A1 * | 1/2008 | Barreto Martins | A01K 29/00 382/110 |
| 2008/0042849 A1 | 2/2008 | Saito et al. | |
| 2008/0143619 A1 | 6/2008 | Wotherspoon | |
| 2008/0168948 A1 | 7/2008 | Truitt et al. | |
| 2008/0221549 A1 | 9/2008 | Cohen | |
| 2008/0306437 A1 * | 12/2008 | Jacobson | A61M 5/142 604/67 |
| 2009/0273439 A1 | 11/2009 | Selsor | |
| 2010/0160809 A1 * | 6/2010 | Laurence | A61D 7/00 600/549 |
| 2010/0295687 A1 | 11/2010 | Kuzniar et al. | |
| 2011/0077659 A1 | 3/2011 | Mandecki et al. | |
| 2012/0016315 A1 | 1/2012 | Radmer et al. | |
| 2012/0126948 A1 | 5/2012 | Brunski | |
| 2012/0193415 A1 | 8/2012 | Coiro, Sr. et al. | |
| 2014/0055248 A1 | 2/2014 | Hammelbacher | |
| 2015/0004679 A1 | 1/2015 | Conger et al. | |
| 2017/0124264 A1 * | 5/2017 | Jordan | G06K 19/07758 |
| 2018/0242889 A1 * | 8/2018 | Izumo | A61B 5/7275 |

FOREIGN PATENT DOCUMENTS

| | | |
|---|---|---|
| JP | 2009-069108 A | 4/2009 |
| JP | 2010-266289 A | 11/2010 |
| WO | WO 2007/033407 A1 | 3/2007 |
| WO | WO 2014/151852 A1 | 9/2014 |
| WO | WO 2015/005802 A1 | 1/2015 |

\* cited by examiner

SYSTEM AND A METHOD FOR ASCERTAINING THE MASS OF AT LEAST ONE ANIMAL

The present application is a National Phase entry of PCT Application No. PCT/AU2017/050115, filed Feb. 11, 2017, which claims the benefit of U.S. Provisional Patent Application No. 62/294,084, filed Feb. 11, 2016, and U.S. Provisional Application No. 62/414,148, filed Oct. 26, 2016, which are incorporated herein by reference.

TECHNICAL FIELD

The disclosure herein generally relates to a system and a method for ascertaining the mass of at least one animal.

BACKGROUND

The health of an animal may be generally ascertained by manual observation and measurement. For example, changes in animal weight may be an indicator of animal stress and may be used for animal quality control and animal health monitoring purposes.

Presently, the mass of animals in an enclosure may be ascertained by manually weighing them. The mass of each animal may then be recorded manually, for example on a record in the form of an enclosure card attached to the enclosure.

Manual counting and weighing of animals is relatively expensive and time consuming. There may be a plurality of enclosures for which animals need to be individually weighed. There may be a hundreds or thousands of animals, making counting and weighing, and then recording the identities and weights, unattractive.

In the context of this specification, an animal may be generally any suitable non-human animal or human, including a laboratory animal, a rodent, a rat, a mouse, a cat, a dog, a rabbit, a bird including a poultry bird, livestock including cattle, sheep and horses, a zoo animal, a fish or generally any type of animal.

SUMMARY

Disclosed herein is a system for ascertaining the mass of an animal having attached thereto a radio frequency identification (RFID) tag. The system comprises a scale for supporting the animal and generating mass information indicative of the mass of the animal when so supported.

The system comprises a RFID reader for interrogating the RFID tag when the animal is so supported, and deriving animal identification information indicative of the identity of the animal from the RFID tag when so interrogated.

An embodiment comprises an animal receiver for receiving the animal, the animal receiver being operatively coupled to the scale. The animal receiver may comprise an enclosure. The enclosure may be a removable enclosure. The enclosure may comprise an enclosure RFID tag that the RFID reader can interrogate to derive enclosure identification information indicative of the identity of the enclosure. The scale may comprise an electronic scale. The electronic scale may comprise a communications interface for sending the mass information indicative of the mass of the animal. The communications interface of the electronic scale may comprise an electronic scale physical network interface.

In an embodiment, the RFID reader comprises a communications interface for sending the identification information indicative of the identity of the animal.

In an embodiment, the RFID reader comprises a communications interface for sending enclosure identity information indicative of the identity of the enclosure, and animal identity information indicative of the identity of the animal. The RFID reader's communication's interface may comprise a RFID reader physical network interface.

An embodiment comprises at least one communications interface for sending at least one of the enclosure identification information indicative of the identity of the enclosure, the mass information indicative of the mass of the animal, and the animal identification information indicative of the identity of the animal. The at least one communications interface may comprise at least one network interface. The at least one network interface may comprise at least one physical network interface.

In an embodiment, the animal identification information indicative of the identity of the animal and the mass information indicative of the mass of the animal is sent to a processor. The enclosure identification information indicative of the identity of the enclosure may be sent to the processor.

In an embodiment, the scale is for supporting each of a plurality of animals that each have attached thereto a RFID tag and generating mass information indicative of the mass of each of the plurality of animals when so supported. The RFID reader may be for deriving animal identification information indicative of the identity of each of the plurality of animals by interrogating the RFID tag attached to each of the plurality of animals. The scale may be configured to support an enclosure for receiving each of the plurality of animals. The enclosure may comprise a removable enclosure.

An embodiment is configured to generate the mass information indicative of the mass of each of the plurality of animals by weighing by difference each of the plurality of animals. Weighing by difference each of the plurality of animals may comprise weighing by difference each of the plurality of animals as the plurality of animals are at least one of incrementally received by the enclosure and decrementally removed from the enclosure.

In an embodiment, the enclosure comprises an enclosure RFID tag that the RFID reader can interrogate to derive enclosure identification information indicative of the identity of the enclosure.

An embodiment comprises at least one communications interface for sending to a processor at least one of the mass information indicative of the mass of each of the plurality of animals and the animal identification information indicative of the identity of each of the plurality of animals.

An embodiment comprises at least one communications interface for sending to a processor at least one of the enclosure identity information indicative of the identity of the enclosure, the mass information indicative of the mass of each of the plurality of animals and the animal identification information indicative of the identity of each of the plurality of animals An embodiment is configured to generate an animal manifest for the removable enclosure comprising at least one of the animal identification information indicative of the identity of each of the plurality of animals, the mass information indicative of the mass of each of the plurality of animals, and the enclosure information indicative of the identity of the removable enclosure. The manifest may be an electronic manifest.

An embodiment is configured to generate the manifest when the enclosure is removed from the scale.

An embodiment is configured to send the animal manifest for the removable enclosure to the processor.

Disclosed herein is a method for ascertaining the mass of an animal having attached thereto a RFID tag. The method comprises the step of generating mass information indicative of the mass of the animal with a scale supporting the animal. The method comprises the step of interrogating the RFID tag to derive animal identification information indicative of the identity of the animal.

An embodiment comprises the step of supporting a removable enclosure on the scale and disposing the animal in the removable enclosure. The removable enclosure may comprise an enclosure RFID tag that is interrogated to derive enclosure identification information indicative of the identity of the removable enclosure.

An embodiment comprises the step of storing in an electronic data store at least one of the animal identification information indicative of the identity of the animal, the mass information indicative of the mass the animal, and the enclosure identification information indicative of the identity of the animal in an electronic data store.

An embodiment comprises the step of generating with the scale mass information indicative of the mass of each of a plurality of animals each having a RFID tag, the plurality of animals comprising the animal, wherein the RFID tag of each of the plurality of animals are interrogated while supported by the scale to derive animal identification information indicative of the identity of each of the plurality of animals. The mass information indicative of the mass of each of the plurality of animals may be generated by weighing by difference each of the plurality of animals as the plurality of animals are at least one of incrementally received by a removable enclosure supported by the scale and decrementally removed from the removable enclosure operatively coupled to the scale.

An embodiment comprises interrogating an enclosure RFID tag of the enclosure to derive enclosure identification information indicative of the identity of the enclosure.

An embodiment comprises storing in an electronic data store the animal identification information indicative of the identity of each of the plurality of animals, the animal mass information indicative of the mass of each of the plurality of animals, and the enclosure identification information indicative of the identity of the enclosure.

An embodiment comprises the step of a processor receiving the mass information indicative of the mass of each of the plurality of animals, the identity information indicative of the identity of each of the plurality of animals and the enclosure identity information indicative of the identity of the enclosure and generating an animal manifest for the removable enclosure comprising the animal identification information indicative of the identity of each of the plurality of animals and the mass information indicative of the mass of each of the plurality of animals.

Disclosed herein is a method. The method comprises the step of at an origin, ascertaining the mass of each of a plurality of animals. The method comprises the step of at a destination, ascertaining the mass of each of the plurality of animals. The method comprises the step of, for each of the plurality of animals, determining whether the difference between the mass at the origin and the mass at the destination satisfies a condition.

In an embodiment, the step of at the origin, ascertaining the mass of each of a plurality of animals comprises:

with scales, weighing by difference each of the plurality of animals as the plurality of animals are disposed in an enclosure to generate origin mass information indicative of the mass of each of the animals and interrogating a respective RFID tag attached to each of the plurality of animals to generate origin identity information indicative of the identity of each of the plurality of animals at the origin. The origin mass information indicative of the mass of each of the animals and the origin identity information indicative of the identify of each of the plurality of animals may be sent to the destination. A RFID tag attached to the enclosure may be interrogated to derive enclosure identity information indicative of the identity of the enclosure. The enclosure identity information indicative of the identity of the enclosure may be sent to the destination.

In an embodiment, a manifest is generated for the removable enclosure comprising the origin identification information indicative of the identity of each of the plurality of animals and the origin mass information indicative of the mass of each of the plurality of animals at the origin. The manifest may be an electronic manifest. The manifest may be sent to the destination. The manifest may be sent to the destination via a physical network interface.

An embodiment comprises the step of, at the destination, ascertaining the mass of each of the plurality of animals comprises:

with scales, weighing by difference each of the plurality of animals as the plurality of animals are removed from the enclosure to generate destination mass information indicative of the mass of each of the plurality of animals and interrogating the respective RFID tag attached to each of the plurality of animals to generate destination identity information indicative of the identity of each of the plurality of animals.

An embodiment comprises the step of, for each of the plurality of animals, determining whether the difference between the mass at the origin and the mass at the destination satisfies a condition comprises the step of, a processor executing an algorithm having the origin mass information and the destination mass information as inputs to determine whether the difference between the mass at the origin and the mass at the destination satisfy a condition.

In an embodiment, the condition is that an animal of the plurality of animals has a mass at the destination that is less than the animal's mass of the origin by a predetermined mass quantity. The predetermined mass quantity comprises at least one of an absolute mass and a relative mass.

In an embodiment, the scales are electronic scales.

An embodiment is for qualifying animals.

An embodiment is for ascertaining a change in the mass of each of a plurality of animals.

An embodiment comprises the step of triggering an alert if the condition is so satisfied.

In an embodiment, ascertaining the mass of each of the plurality of animals is performed in accordance with a method described above.

Disclosed herein is a method for identifying each of a plurality of animals. Each of the plurality of animals having attached thereto an RFID tag. The method comprises the step of disposing the plurality of animals in an enclosure. The method comprises the step of interrogating the RFID tag of each of the plurality of animals while disposed in the enclosure to derive identity information indicative of the identity of each of the plurality of animals.

In an embodiment, the identity information is origin identity information indicative of the identity of each of the plurality of animals disposed in the enclosure at an origin.

An embodiment comprises transporting the enclosure having disposed therein the plurality of animals to a destination.

An embodiment comprises the step of, at the destination, interrogating the RFID tag of each of the plurality of animals to derive destination identity information indicative of the identity of each of the plurality of animals disposed in the enclosure at the destination.

An embodiment comprises the step of comparing the destination identity information and the origin identity information for determining a difference therebetween.

In an embodiment, the step of interrogating the RFID tag of each of the plurality of animals is performed using a system in accordance with the above disclosure.

An embodiment comprises a processor comparing the identity information for each of the plurality of animals in the enclosure with information indicative of the identity of a plurality of animals selected or intended to be disposed in the enclosure, and the processor subsequently triggering an alert if the retrieved animal identity information for each of the plurality of animals in the enclosure does not match the information indicative of the identity of the plurality of animals selected or intended to be disposed in the enclosure.

An embodiment comprises a processor comparing animal characteristic information indicative of at least one characteristic of each of the plurality of animals disposed in the enclosure with information indicative of at least one predetermined characteristic, and the processor subsequently triggering an alert if the retrieved animal characteristic information indicative of at least one characteristic of each of the plurality of animals in the enclosure does not match the information indicative of at least one predetermined characteristic.

Disclosed herein is non-transitory processor readable tangible media including program instructions which when executed by a processor causes the processor to perform a method in accordance with the above disclosure.

Disclosed herein is a computer program for instructing a processor, which when executed by the processor causes the processor to perform a method in accordance with the above disclosure.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying in which.

DESCRIPTION OF EMBODIMENTS

Figure 1:
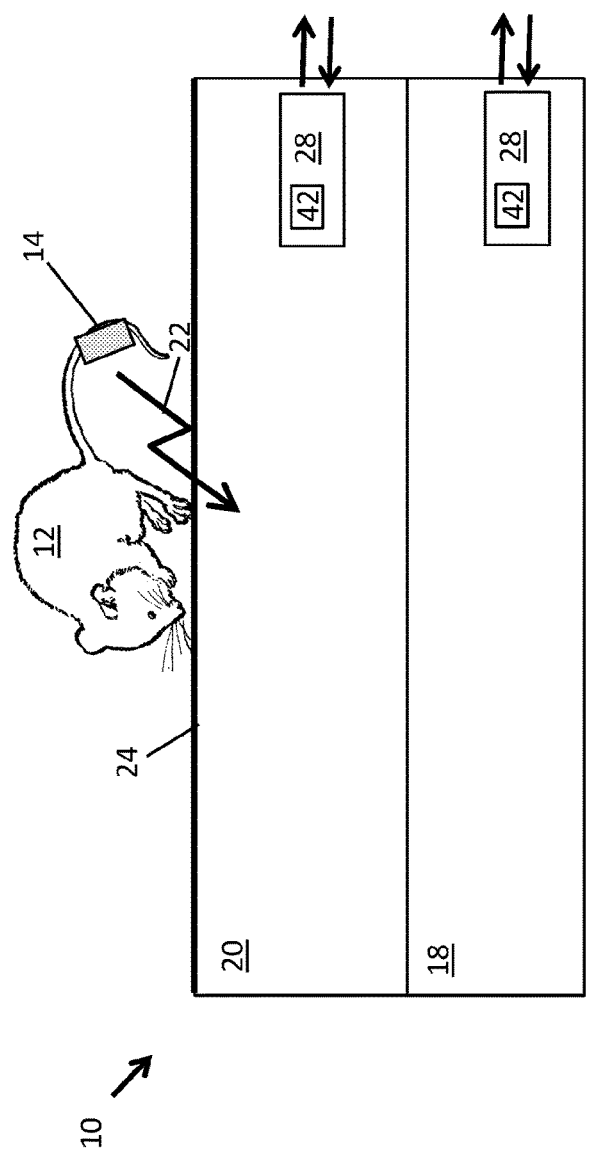
FIG. 1 shows a schematic diagram of an embodiment of a system for ascertaining the mass of an animal having attached thereto a RFID tag.

FIG. 1 shows a schematic diagram of an embodiment of a system for ascertaining the mass of an animal having attached thereto a radio frequency identification (RFID) tag, the system, animal and RFID tag being indicated by the numerals 10, 12 and 14 respectively. The system 10 comprises a scale 18 ("weighing scale") in the form of an electronic scale for supporting the animal 12 and generating mass information indicative of the mass of the animal 12 when so supported. The system 10 comprises a RFID reader 20 for interrogating the RFID tag 14 which when interrogated generates a RFID tag signal 22 ("animal RFID tag signal") from which the RFID reader 20 can derive animal identification information indicative of the identity of the animal 12.

The animal 12 is a mouse, however the animal may be generally any suitable non-human animal, including a laboratory animal, a rodent, a rat, a cat, a dog, a rabbit, a bird including a poultry bird, livestock including cattle, sheep and horses, a zoo animal, a fish or generally any type of animal.

The RFID reader 20 and the scale 18 are separate units with the RFID reader 20 supported by the scale 18. That is, the reader 20 is resting on the scale 18. In another embodiment, however, the scale 18 is supported by the RFID reader 20. That is, the scale 18 rests on the RFID reader. In yet another embodiment, the RFID reader 20 and the scale 18 are integrated and have a common communications interface.

The RFID tag 14 comprises an integrated circuit comprising non-volatile memory which stores the animal identification information and may store other variable information. The radio signal 22 is generated according to an air interface protocol which may be any suitable air interface protocol, for example RAIN RFID, and EPC global UHF Class 1 Gen2/ISO 18000-63 (formerly 18000-6C).

The system 10 comprises an animal receiver 24 in the form of an upward facing surface for receiving the animal 12. The receiver 24 may be an upward facing surface of the RFID reader, as shown in FIG. 1, or in alternative embodiments an upward facing surface of the scales 18 or integrated scale-RFID reader. Generally, the receiver may take any suitable form.

The system 10 comprises at least one communications interface 28 for sending the mass information indicative of the mass of the animal 12, and the animal identification information indicative of the identity of the animal 12. The at least one communications interface 28 comprises in this embodiment a suitable physical communication interface, in this embodiment a connector in the form of a data plug or data socket and associated physical layer circuitry. The communications interface 28 may optionally comprise one or more higher communication layers in communication circuitry 46 (e.g. data link and application layers of the OSI model), or these may be incorporated in other subsystems of the RFID reader 49 and the scale 18. The at least one communications interface 28 is in the form of a network interface, for example for USB, IEEE 802.3 ("ETHERNET" and variants thereof), PCIe, THUNDERBOLT, IEEE 802.15.1 ("Bluetooth" and variants thereof), IEEE 802.11 ("Wi-Fi"), RS232, a PAN, a LAN, a WAN, or generally any suitable form of communications interfaces and protocols. In this but not all embodiments, the at least one communications interface 28 comprises two communication interfaces. The RFID reader 20 comprises a communications interface for sending the animal identification information, and the scale comprises a communications interface for sending the mass information. Alternative embodiments may have one or more than two communication interfaces. In the present embodiment the communications interfaces 28 each comprise USB physical interfaces comprising USB connectors, for communicating over a USB network. The mass and/or identity information is sent in datagrams in the form of a plurality of USB packets which contain the mass and/or identity information, as packet payloads. Other protocol datagrams may be used, for example Ethernet or Wi-Fi datagrams (packets and/or frames, for example).

Figure 2:
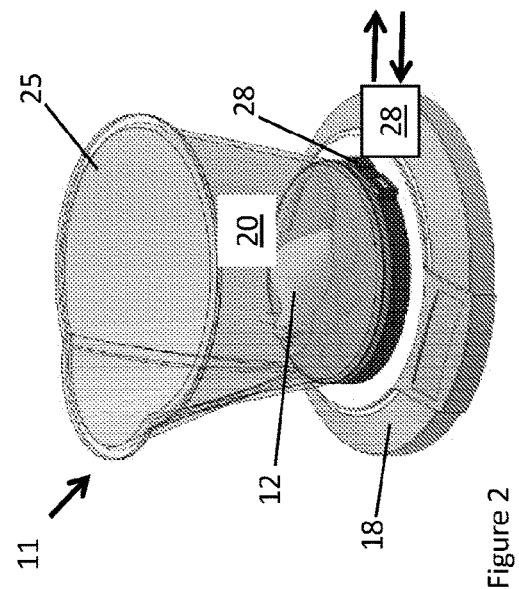
FIG. 2 shows a schematic diagram of another embodiment of a system for ascertaining the mass of an animal having attached thereto a RFID tag.

FIG. 2 shows a schematic diagram of another embodiment of a system 11 for ascertaining the mass of an animal 12 having attached thereto a radio frequency identification (RFID) tag 14, where parts having similar or identical function and/or form to those of the embodiment of FIG. 1 are identically numbered. The RFID reader 20 comprises an enclosure 25. The enclosure 25 comprises a bowl, however it may take any suitable form including a petri-dish, carton, cage, and box. The RFID reader 20 and the scale 18 each have a respective communications interface in the form of a wireless communications interface operable at radio frequencies, in this embodiment BLUETOOTH 4.1 CLASSIC interface, for communication with a processor. The communication interfaces may have any of the features and/or properties described with respect of the system 10 and variations thereof. The RFID reader 20 and the scale 18 are separate units, however they may be integrated. The RFID reader 20 is supported by the scale 18. The enclosure 26 is removable, but it may not be in an alternative embodiment.

An embodiment of a method for ascertaining the mass of the animal 12 having attached thereto the RFID tag 14 will now be described. The embodiment of the method may be performed using the system 10, 20 for example, or generally any embodiment of a suitable system described herein. In a step, mass information indicative of the mass of the animal 12 is generated with the scale 18 supporting the animal 12. In a step, the RFID tag 14 is interrogated while the animal 12 is so supported to generate a RFID radio signal 22 from which is derived animal identification information indicative of the identity of the animal 12. This but not all embodiments comprise the step of sending the identification information and the mass information, which may be sent via the at least one communications interface 28 for example.

Figure 3:
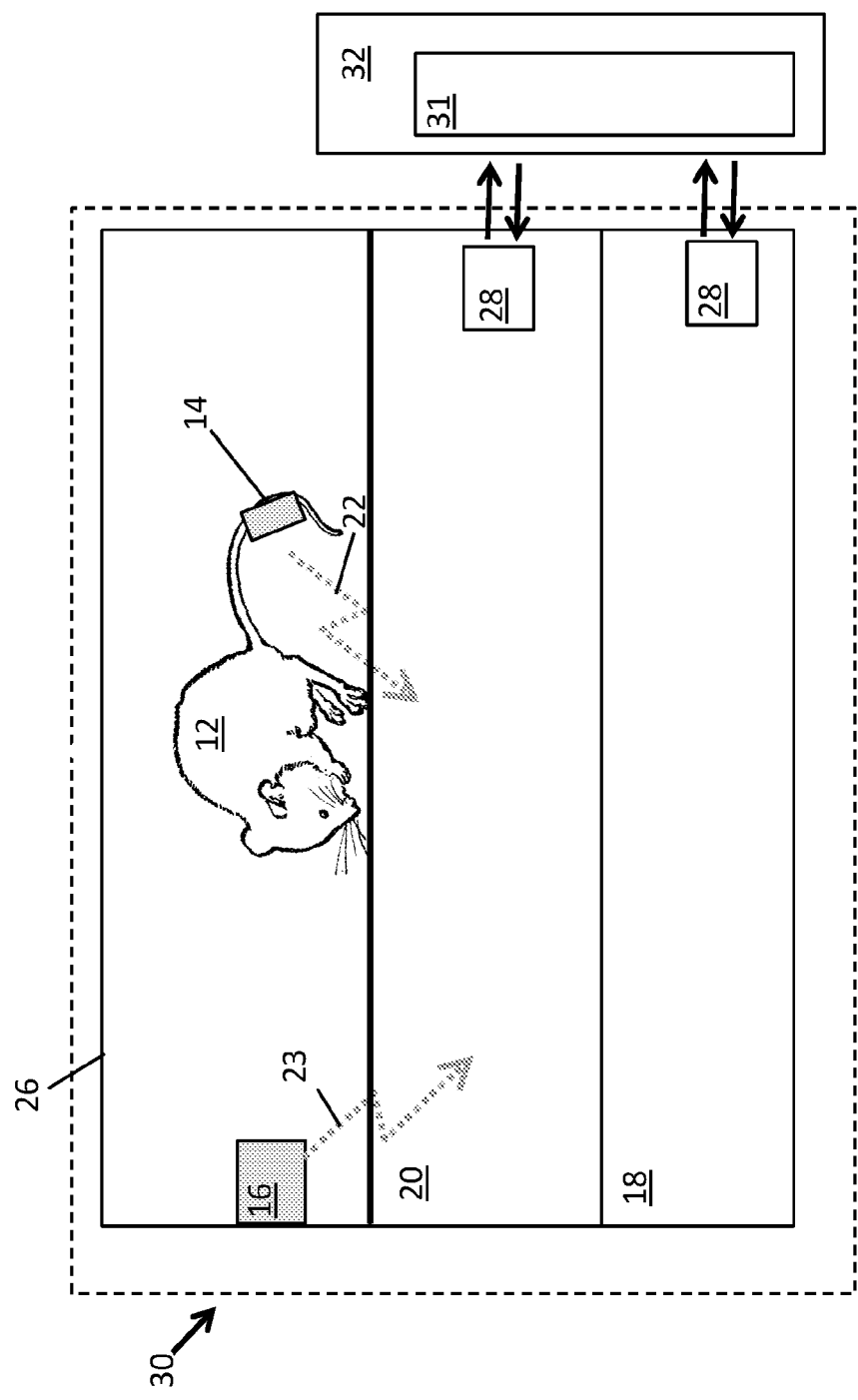
FIG. 3 shows a schematic diagram of yet another embodiment of a system for ascertaining the mass of an animal having attached thereto a RFID tag.

FIG. 3 shows a schematic diagram of yet another embodiment of a system 30 for ascertaining the mass of an animal 12 having attached thereto a RFID tag 14, where parts having similar or identical function and/or form to those of the embodiment of FIG. 1 are identically numbered. The system 30, in this embodiment the scales 20, are configured to support an enclosure 26 in the form of a carton, or alternatively a cage, box, bowl, petri-dish or generally any suitable form of enclosure. The scales 18 have a flat surface for supporting the enclosure, however an alternative embodiment may have a stand for supporting the enclosure. The enclosure 26 is removable, however in an alternative embodiment it is integral, that is not removable. The removable enclosure 26 is in this but not all embodiments is configured for transporting the animal 12, and includes a closure for containing the animal during transportation and air holes for transport of air into the enclosure. The removable enclosure 26 is in the form of a carton. The carton has a closure in the form of a plurality of flaps attached to a rim thereof that can cover the opening within the rim, and the flaps subsequently fastened with adhesive tape, for example. The enclosure 26 has an enclosure RFID tag 16 attached which generates an enclosure RFID radio signal 23 when interrogated, from which the RFID reader 20 can derive enclosure identification information indicative of the identity of the removable enclosure 26. The enclosure 25 identification information may comprise, as in this embodiment, one or more symbols for example a serial number. The one or more symbols may uniquely identify the enclosure.

The system 30 comprises at least one communications interface 28 for sending the enclosure identification information indicative of the identity of the removable enclosure 26, the mass information indicative of the mass of the animal 12, and the animal identification information indicative of the identity of the animal 12. In this but not all embodiment, the at least one communications interface comprises two communication interfaces, one for the RFID reader 20 for sending the animal identification information, and one for the scale 18 for sending the mass information. Alternative embodiments may have one or more than two communication interfaces. The communication interfaces may have any of the features and/or properties described with respect of the system 10 and variations thereof.

The communications interface 28 is for sending the enclosure identification information indicative of the identity of the removable enclosure 26, the mass information indicative of the mass of the animal 12, and the animal identification information indicative of the identity of the animal 12 to a processor 32 configured to write to a data store 31 in the form of a computer database. The data store 31 may be held within non-volatile memory, for example a hard drive or solid state drive, within the processor 32 or a peripheral thereof, or may be stored within another processor in the form of a computer server, for example. The enclosure information, the animal identification information and the animal mass information may be separate fields in a data base record or table, for example.

An embodiment of the method comprises the step of supporting the removable enclosure 26 on the scale 18, disposing the animal 12 in the removable enclosure 26, and generating the mass information with the scale 18. The enclosure RFID tag 16 may be interrogated to generate another RFID radio signal ("enclosure RFID radio signal") from which is derived enclosure identification information indicative of the identity of the removable enclosure 26. The animal 12 identification information, the mass information, and optionally the enclosure identification information may be stored in the data store 31 in the form of a computer data base.

Figure 4:
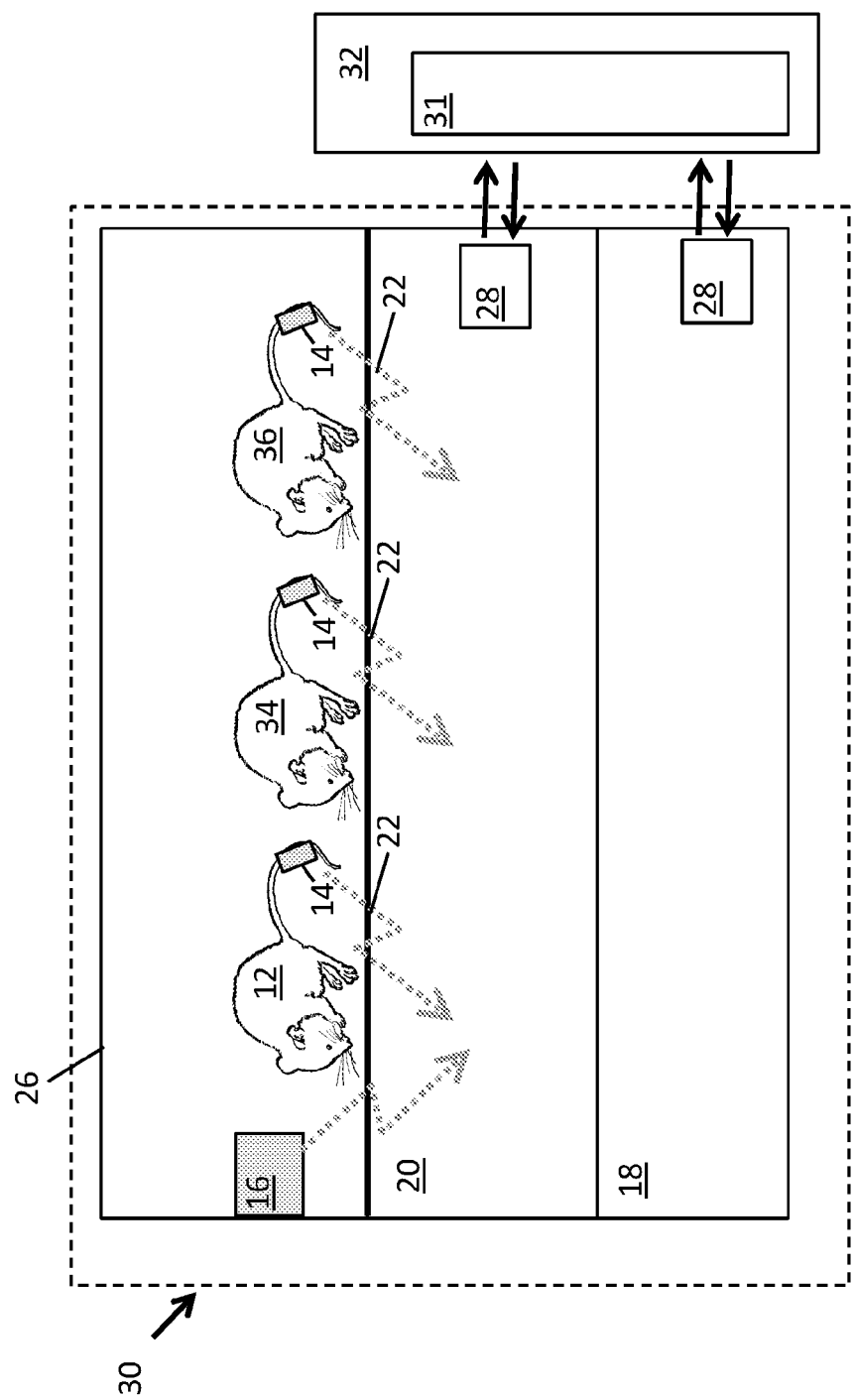
FIG. 4 shows the system of FIG. 3 supporting each of a plurality of animals that each have attached thereto a respective RFID tag.

FIG. 4 shows the system of FIG. 3 wherein the scale 18 is supporting each of a plurality of animals 12, 34, 36 that each have attached thereto a respective RFID tag 14. Parts having similar or identical function and/or form to those of the embodiments of FIG. 1 or FIG. 2 are identically numbered. The plurality of animals 12, 34, 36 are in the removable enclosure 26. The removable enclosure and animals therein are supported by the scale 18. Mass information indicative of the mass of each of the plurality of animals 12 can be generated with the scale 18 when supported by the scale 18. The RFID reader 20 can interrogate the RFID tag 14 of each of the plurality of animals 12, 34, 36 while the plurality of animals 12, 34, 36 are supported by the scale 18. Each of the plurality of animal's RFID tag generates a RFID radio signal when interrogated. The RFID reader 20 can derive animal 12 identification information indicative of the identity of each of the plurality of animals 12 from the RFID radio signals generated by RFID tags of the plurality of animals.

The system 30 is configured to cooperate with the processor 32 to generate the mass information indicative of the mass of each of the plurality of animals 12 by weighing by difference each of the plurality of animals 12 as the plurality of animals 12 are incrementally received by the removable enclosure 26. The steps of one weighing by difference technique as used in the present embodiment is now described, although any suitable weighing technique may be used to determine the mass of each of the plurality of animals. In a step, the mass of the enclosure is measured. The scales may be zeroed so the mass of the enclosure is read as zero, in which case the mass of the enclosure need not be measured. In a step, the mass of the enclosure having disposed therein a single animal 12 of the plurality of animals is measured. In a step, the mass of the enclosure with the first animal 12 and a second animal 34 disposed therein is measured. This step may be repeated until all of the plurality of animals are disposed in the enclosure. In a step, the difference between a mass value from a mass measurement and another mass value from the preceding mass measurement gives the mass of the animal last received by the removable enclosure. Any further animals may also be weighed by difference as they are received by the enclosure. The mass information and the identification information is associated, and then further associated with the enclosure identification in the data store 31 in the form of a database. For example, the RFID reader 20 may repeatedly generate interrogation radio signals (For example, 10 time a second) and send to the processor 32 received identity information generated in response to the interrogation signal. The scale 18 may repeatedly generate mass information indicative of the mass of the load received (including those of the plurality of animals received) and send to the processor the mass information. The processor 32 may execute a weighing by difference algorithm and/or program, by which the processor 32 is instructed to monitor for the detection of animals, and when an animal is detected determine the mass of the animal by subtracting the mass of the load ascertained before and after detection of the animal.

These steps can be repeated for more than one plurality of animals received in respective enclosures.

The processor 32 stores in the data store 31 the mass information indicative of the mass of the plurality of animals 12, 34, 36 and the animal identification information indicative of the identity of the plurality of animals 12, 34, 36 and the enclosure information indicative of the identity of the enclosure. The information is associate in the database 31. By querying the database, the identity of the animals in any one of a plurality of removable enclosures, the weight of the animals in any one the plurality of removable enclosures, and the identity of the enclosure any one of the plurality of animals is disposed may be determined. The processor 32 is configured to generate an animal manifest for the removable enclosure 26 comprising the animal identification information for each of the plurality of animals 12, 34, 36 the mass information for each of the plurality of animals 12, 34, 36 and the enclosure information indicative of the identity of the removable enclosure 26. The manifest is in this embodiment an electronic manifest stored in memory 34 in the form of non-volatile memory, for example flash memory or a hard drive. The manifest may comprise a computer readable file, for example a XML, file, a JSON file, a text file, a coma separated value text file, or generally of any suitable file format. The manifest may comprise a plurality of datagrams comprising the animal identification information for each of the plurality of animals 12, 34, 36 the mass information for each of the plurality of animals 12, 34, 36 and the enclosure information indicative of the identity of the removable enclosure 26. The data store 31 may also be in the memory. The manifest may be sent by the processor 32 to another processor at the enclosure's destination for checking the weight of the plurality of animals 12, 14, 36 on their arrival at the destination. The processor 32 is configured to generate the manifest when the enclosure is removed from the scale.

A vendor of the animals may send a plurality of enclosures each comprising a plurality of animals to a destination. The system 30 may be used to generate a manifest for each of the plurality of enclosures, and the manifest subsequently sent to the destination.

The communications interface 28 can send to the processor 32 configured to write to the data store 31 the enclosure identification information indicative of the identity of the removable enclosure 26, the mass information indicative of the mass of each of the plurality of animals 12, 34, 36 and the animal identification information indicative of the identity of each of the plurality of animals 12, 34, 36.

Figure 5:
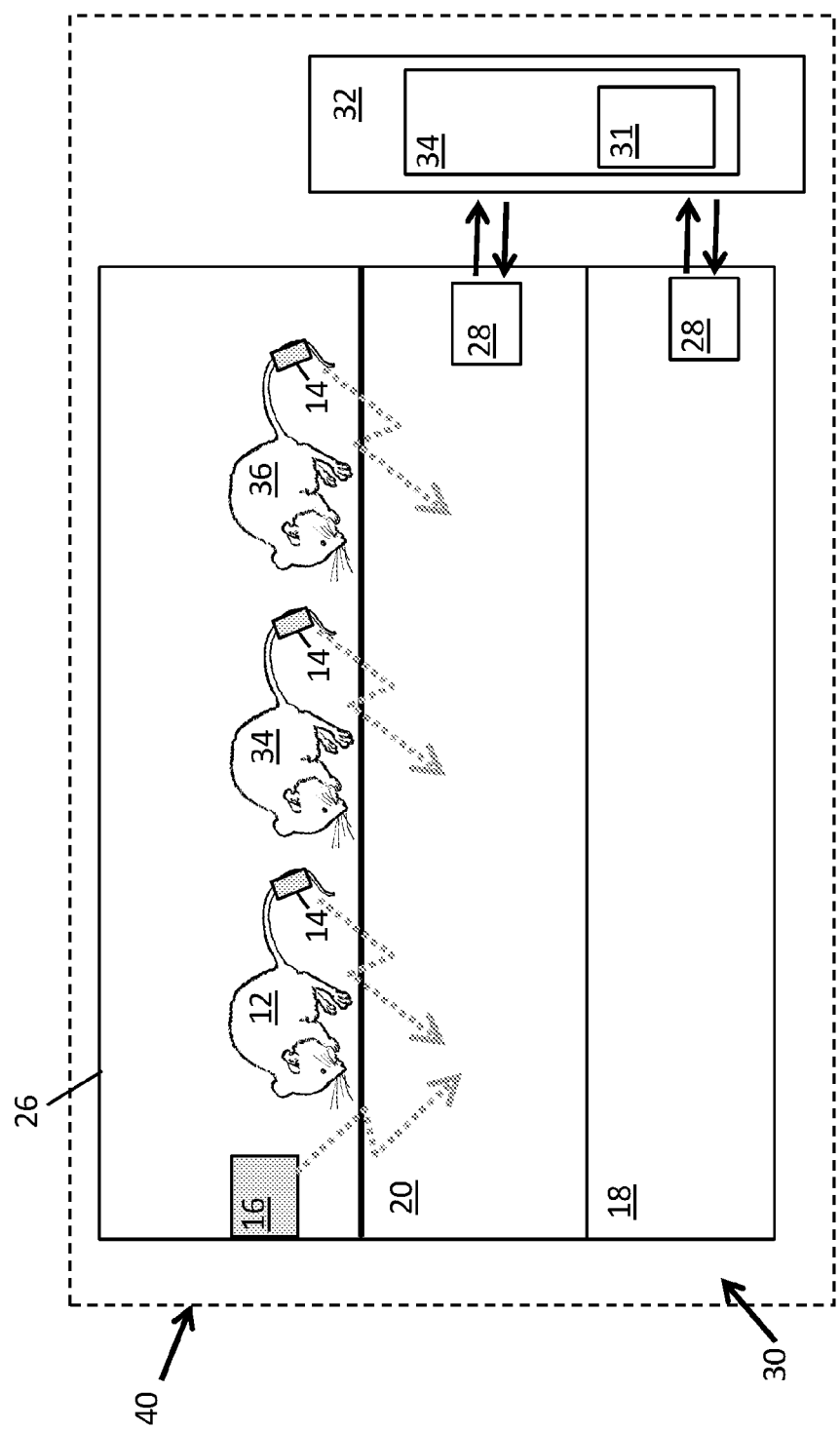
FIG. 5 shows a schematic diagram of another embodiment of a system for ascertaining the mass of an animal additionally comprising a processor.

FIG. 5 shows a schematic diagram of another embodiment of the system 40 additionally comprising the processor 32 configured to write to the data store 31. Parts having similar or identical function and/or form to those of the embodiments of FIGS. 1-3 are identically numbered.

A system that is identical (or alternatively similar) to system 30 or 40 is at the destination. The animals may be removed from the enclosure 26 at the destination while the enclosure is received by destination system 30, 40. The destination system ascertains the identity of the removed animals using the RFID reader 20 and the mass of the remaining animals by weighing by difference. The system at the destination is configured to generate the mass information indicative of the mass of each of the plurality of animals by weighing by difference each of the plurality of animals as the plurality of animals are decrementally removed from the enclosure. The steps of another weighing by difference technique as used in the present embodiment is now described, although any suitable weighing technique may be used to determine the mass of each of the plurality of animals at the destination. The mass of the enclosure with the plurality of animals therein is measured. The mass of the enclosure after removal a single animal 12 of the plurality of animals therefrom is measured. The mass of the enclosure with the first animal 12 and a second animal 34 removed therefrom is measured. The difference of a mass measurement and that of the one after it gives the mass of the animal last removed from the enclosure. Any further animals may also be weighed by difference as they are removed from the enclosure. The processor 32 of system 40 may execute a weighing by difference algorithm and/or program. An example of a weighing by difference algorithm executed by the processor includes the steps of:

Receiving a time series of mass information from the scale 18, and mass information in the series of mass information each being indicative of the mass of at least those of the plurality of animals supported thereby Receiving a series of identity information from the RFID reader 20 indicative of the identities of those of the plurality of animals supported by the scale 18

By monitoring the series of identity information, determine the time when an animal of the plurality of animals is disposed in or removed from the enclosure 26, and determining a change in the time series of mass information at the time.

Another embodiment may use another suitable weighing by difference algorithm.

The mass and identification information is associated, and then further associated with the enclosure identification in the data base 31.

A processor 32 of the system 40 (or alternatively the processor 32 in communication with system 30) at the destination, may compare the mass of each of the plurality of animals ascertained at the origin and the mass of each of the plurality of animals ascertained at the destination. The processor 32 at the destination may use the manifest, which may be sent to the destination processor 32 by the processor 32 at the origin via a network in the form of a computer network or internetwork, for example. The processor executes an algorithm having the origin mass information and the destination mass information as inputs to determine whether the difference between the mass at the origin and the mass at the destination satisfy a condition. The steps of one example algorithm used by the present embodiment include, for example:

- Reading the origin mass and identify information from the manifest and store it in memory
- Compare the origin mass information stored in memory with the destination mass information retrieved from the data store for each of the plurality of animals, which may comprise subtracting one from the other or dividing one by the other to obtain a figure of merit
- Determine if the figure of merit satisfies a condition, for example is within a range, or is less than or greater than a predetermined value.

Other embodiments may use another suitable algorithm.

The destination processor 32 may trigger an alert if the destination processor 32 determines that one of the received animals has lost a predetermined mass (either in absolute terms for example 1 g, or in relative terms for example 5%), or the animal does not meet an animal mass criteria (for example the animal is not greater than a predetermined minimum weight or the animal is not within a predetermined weight range). Weight loss may indicate animal mistreatment or stress.

The trigger may cause an audible alert (for example a chime, horn or generally any suitable sound) of a visual alert (for example a change in an object, for example its colour, displayed on an electronic visual interface), or an electronic message to be sent, for example a message via SMS. A non-qualifying animal 14 may be separated by a user, for example, who is removing the animals one-by-one from the enclosure at the destination. An animal that is underweight or has lost significant weight during transport may be excluded from an experiment, for example, which may otherwise detract from the experiment. That is, the difference between the mass at the origin and the mass at the destination satisfies a condition in the form of a non-qualifying condition for the experiment. Alternatively or additionally, the animal identified to be underweight may be fattened before becoming a subject of an experiment, for animal welfare and/or experimental purposes. The destination processor 32 is configured to trigger an alert if an animal on the manifest is not in the enclosure at the destination, or an animal not on the manifest is in the enclosure at the destination.

In some alternative embodiments, the RFID tags of the plurality of animals 12, 34, 36 are interrogated at the origin and/or destination to identify the animals disposed in the enclosure, but none of the plurality of animals are weighed. The manifest may contain only identity information indicative of the identity of each of the plurality of animals 12, 34, 36, in which case the scales 18 may not be required at either the origin or the destination. The processor 32 may compare the manifest, for example, with the determined identities at the destination, to determine if there is a difference, for example a missing or an extra animal at the destination.

An embodiment of a method for ascertaining the mass of the plurality of animal 12 each having attached thereto an RFID tag 14 will now be described. The embodiment of the method may be performed using either one of system 20, 30 and 40 for example. A step comprises generating mass information with the scale 18 indicative of the mass of each of a plurality of animals 12 that each have a RFID tag 14. In a step, the RFID tag 14 of each of the plurality of animals 12, 34, 36 is interrogated while each of the plurality of animals are supported by the scale 18 to generate a RFID radio signal for each of the plurality of animals 12, 34, 36 from which is derived animal 12 identification information indicative of the identity of each of the plurality of animals 12, 34, 36.

Some embodiments of the method comprise the step of weighing by difference each of the plurality of animals 12, 34, 36 as they are incrementally received by the enclosure 26, or decrementally removed from the animal enclosure 26. The enclosure RFID tag 16 is interrogated by the RFID reader 20 to generate another RFID radio signal from which is derived enclosure identification information indicative of the identity of the enclosure.

In an optional step, the animal identification information indicative of the identify of each of the plurality of animals 12, 34, 36, the mass information indicative of the mass of each of the plurality of animals 12, 34, 36 and the enclosure RFID information indicative of the identity of the enclosure 26 is stored in the data store 31. In an optional step, a processor generates an animal manifest in the form of an electronic animal manifest for the removable enclosure 26 comprising the animal identification information for each of the plurality of animals 12 and the mass information for each of the plurality of animals 12.

The processor 32 may check that only the animals selected or intended to be disposed in the enclosure are disposed in the enclosure. For example, in an embodiment, the processor 32 is configured to confirm that only the intended animals are placed in the removable enclosure 26.

The processor 32 may retrieve the animal identity information for each of the plurality of animals in the enclosure 26, for example from at least one of the data store 31 and the electronic animal manifest. The processor 32 may compare the animal identity information for each of the plurality of animals in the enclosure 26 with information indicative of the identity of a plurality of animals selected or intended to be disposed in the enclosure 26. The processor 32 may trigger an alert if the retrieved animal identity information for each of the plurality of animals in the enclosure 26 does not match the information indicative of the identity of the plurality of animals selected or intended to be disposed in the enclosure. The alert may be, for example, a message, graphic or symbol displayed on an electronic display, a message sent to, for example, a smart phone, an audible alert, or generally any suitable alert.

The processor 32 may check that only animals having a predetermined characteristic are disposed in the enclosure. The processor 32 may retrieve animal characteristic information indicative of at least one characteristic of each of the plurality of animals disposed in the enclosure 26, for example from the data store 31. The processor 32 may compare the animal characteristic information for each of the plurality of animals with information indicative of at least one predetermined characteristic. The processor may trigger an alert if the retrieved animal characteristic information indicative of at least one characteristic of each of the plurality of animals disposed in the enclosure 26 does not match the information indicative of at least one predetermined characteristic. The information indicative of at least on predetermined characteristic may be, for example, the sex of each of the plurality of animals. It may be desirable, for example, for the plurality of animals disposed in the box to have the same sex. The characteristic may be any suitable characteristic, for example strain, a genetic characteristic, and species.

RFID Tag

The RFID tag 14 implanted in the animals is now described, however it will be appreciated the generally any suitable RFID tag may be used. The RFID tag 14 has a length of 4 mm, width 0.5 mm and a height of 0.2 mm. The RFID tag 14 comprises an assembly comprising a RFID integrated circuit the form of an IMPINJ MONZA RP-6. The assembly has a dipole antenna comprising 2 parts that are each 2 mm long strips of copper that are gold plated. The assembly comprises an antenna substrate in the form of a sheet of KAPTON. The assembly is encapsulated in biologically inert parylene, the encapsulating layer of parylene having a thickness of 2-5 µm. Alternatively, a SAW RFID tag may be used.

RFID Reader

The RFID reader 20 comprises a RFID antennae and a RFID receiver is signal communication with the antennae. Electrically conductive pathways in the form of cables wires and/or traces for example, may electrically connect the RFID antennae and the RFID receiver. The cables are in this embodiment co-axial cables for radio frequencies, for example UHF, received and/or transmitted by the RFID tag 14. The RFID reader receiver comprises an amplifier that amplifies the RFID tag radio signal 22 received via the antennae. The receiver comprises a demodulator that compares the modulated signal to a signal generated by an oscillator of the same carrier frequency, thereby extracting a message from the radio signal.

A RFID reader controller in the form of a digital signal processor is configured to process the message extracted from the signal 22 to obtain the animal identification information. The RFID reader controller sends the animal identification information. The RFID reader controller generally controls communications with middleware and backend systems, runs the primary operation systems for the RFID reader, and controls memory usage.

A code in the form of an Electronic Product Code (EPC) may be stored in the RFID tag's memory, written to the tag by an RFID reader, and which may take the form of, for example, a 96-bit string of data. The first eight bits may be a header which identifies the version of the air interface protocol. The next 28 bits may identify the organization that manages the data for this tag. The organization number may assigned by the EPC global consortium. The EPC or part thereof may be used as a key or index number to uniquely identify that particular animal represented in the data store 31. Stored in RFID tag user memory may be an object class, identifying the kind of animal the tag is attached to (e.g. "mouse" or "rat"), and a unique number for a particular tag encoded as follows:

Position 1=Gender
  0=Male
  1=Female
Positions 2-9
  Enclosure ID (2 numeric digits 00 to 99 which addresses 8 bits, 2-5 for the first digit 0-9 and positions 6-9 for the second digit 0-9)
Positions 10-18
  Strain code (00-9Z)
Positions 19-26
  Protocol ID—a two digit numeric code The RFID reader may send a string of symbols comprising, for example, the code, last seen time for the tag 14, last seen date for the tag 14, first seen time for the tag 14, first seen date for the tag 14, received signal strength indicator (RSSI), Protocol control (PC) and a cyclic redundancy check (CRC).

In the present embodiments, but not all embodiments, when the antenna is activated beneath one or a plurality of RFID tagged animals, the antenna will capture and transmit to the reader:
  The date and time the antenna activated
  A unique identification
  The RFID tag EPC codes it read (one or more animal tag codes and the enclosure tag EPC code)
  All data in the User Memory portion of the read RFID tags.

The RFID reader 20 comprises a RFID interrogation signal transmitter configured to transmit an RFID interrogation signal via the RFID antennae. The RFID interrogation signal uses an air interface protocol which may be any suitable air interface protocol. The RFID interrogation signal transmitter may comprise a base band transmitter to generate the interrogation signal, a power amplifier to amplify the signal produced by the oscillator and a modulator to modulate the amplitude, frequency or phase of the oscillator's frequency. While the RFID reader 20 is monostatic, other embodiments may be bistatic (that is separate antenna for transmitting the interrogation signal and receiving the radio signal 22) or multistatic, for example.

The RFID reader 20 may comprise a RFID reader processor, for example, at least one of a digital signal processor, and an application specific integrated circuit (ASIC) incorporating signal processing functions described above. In the present embodiment, however, the RFID reader comprises a host logic device and at least one RFID reader chip in the form of an IMPINJ INDY RS2000 reader chip. When using the IMPINJ INDY RS2000 reader chip, a MONZA R6-P RAIN RFID tag chip, for example, may be attached to the animal, however generally any suitable RFID tags may be used. The host is in communication with the reader chip via a UART serial interface or generally any suitable interface. The host comprises a RASBERRY PI, supporting 10/100 Ethernet, and 2.4 GHz 802.11n wireless, BLUETOOTH 4.1 CLASSIC and BLUETOOTH LOW ENERGY, and USB 2.0. Communication with the processor may be with any of these protocols. Any suitable host may be used, including QUALCOMM Dragonboard 410c, system-on-a-board and microcontrollers, an example of which is the MSP430 IRI-LT host microcontroller. The RFID reader processor sends the read identification information in a datagram having the identification information as a payload, via a USB interface or alternatively via the Ethernet interface, or generally any suitable communications interface is provided.

The reader 20 comprises a printed circuit board assembly (PCBA) comprising the host logic device, RFID reader chip, and firmware. Traces on the PCB electrically connect the host and chip. A user interface for the reader 20 may be presented on a smart phone or tablet computer, for example.

The RFID reader may comprise a housing suitable for supporting the scales, for example a steal, or hard polymer case.

Processor

The processor 32 is in the form of a computing device. The computing device is a general purpose computer (e.g. a personal computer, a laptop, etc.), however it may be a smart phone, tablet computer, QUALCOMM Dragonboard 410c, system-on-a-board, embedded system, or generally any suitable device. The processor 32 may be a computer server, for example a computer server in communication with the system 10, 20, 30, 40 via a computer network in the form of any one of a LAN, WAN, Ethernet network, a Wi-Fi network, or a cellular network or internetwork, for example the internet. The processor 32 may be a virtual machine or cloud virtual server in the form of an AZURE, AMAZON or another server. The cloud virtual server may have a N tier architecture, in which presentation, application processing, and data management functions may be physically separated. It has a service orientated modular architecture. The cloud virtual server architecture provides infrastructure services (hosting, DR, storage, CPU, RAM, Firewalls etc.). Azure internet of things hub may manage connectivity to each system 10, 20, 30, 40.

The processor 32 has non-transitory processor readable tangible media in the form of non-volatile memory (for example FLASH memory or a hard drive). Stored in the memory is a software application that comprises program instructions that when executed by the processor cause the processor to perform a method disclosed above.

Network

Any suitable network or combination of networks may be used, examples of which include but are not limited to a personal area network (e.g. a Universal Serial Bus network, a BLUETOOTH network, a FireWire network), packet-switched networks, a local area network (e.g. an Ethernet network defined by the standard IEEE802.3 or a variant thereof, a Wi-Fi network defined by the standard IEEE 802.11 or a variant thereof, a Fibre Channel network), a metropolitan area network, a wide area network (e.g. packet over SONET/SDH, MPLS, Frame Relay), or a meshed radio network, for example, a ZIGBEE network. A point-to-point connection, for example using RS232 protocol, may be used as suitable.

Scale

The example scale 18 used in embodiments disclosed herein are now described. The scale 24 is an electronic scale in the form of electronic spring scale, wherein a deflection beam is operationally coupled to the animal or enclosure receiver 24. The deflection of the deflection beam is measured with a strain gauge coupled thereto, which has a length-sensitive electrical resistance. The resistance of the strain gauge is measured electronically by a resistance measurement circuit in communication with a scale processor in the form of a microcontroller, for example a MICROCHIP PIC MCU with Ethernet and USB connectivity, and FLASH memory or generally any suitable logic device. The scale processor receives a resistance value for the strain gauge and executes a mass conversion algorithm involves determining the resistance value and looking up resistance-mass look-up table to infer the value of the mass of the received load, generating mass information indicative of the load. The algorithm may include a zeroing algorithm. The scale processor sends the mass information in a datagram having the inferred mass value of the received load as a payload, via a USB interface or alternatively via the Ethernet interface, or generally any suitable communications interface as provided.

In some embodiments, however, the scale processor may infer weight (i.e. the force exerted by the load on the scale by gravity) rather than mass. In the context of this document, mass should be understood to encompass weight.

It will be appreciated that the scale may be any suitable type of scale, and may include a strain gauge, Bourdon tube, balance, or generally any suitable mechanism and/or electronics to measure weight and calculate mass.

The scale 18 comprise a housing suitable for supporting the enclosure or animal, for example a steal, or hard polymer case.

RFID Implantation

The RFID tag 14 may be implanted in the animal 12 as follows. A dermal incision is made. The dermal incision may be a dermal tail incision, however the RFID tag 14 may be attached to any suitable part of the animal 12. Optionally, bio-inert and sterile mineral oil may be applied to the skin surface to lubricate the skin to facilitate the piercing procedure. The incision may be made, for example, by forcing a skin-piercing tool into the dermis. The skin-piercing tool may in the form of, for example, a trocar, or a sharp blade or generally any suitable tool. In another step, a cannula is inserted into the dermal incision. The cannula may be inserted between the upper dermal layer and the epidermis for a distance of, for example, 5 mm. The RFID tag 14 is communicated through the cannula and out of a distal opening thereof. In another step, the cannula is withdrawn from the dermal incision.

Now that embodiments have been described, it will be appreciated that some embodiments may have some of the following advantages:

Weighing at least one animal for transportation in a shipping container or other enclosure may be automated to reduce errors and/or labour.

The identity of each of at least one animal, disposed in a shipping carton or other enclosure can be automatically recorded.

The identity and mass of at least one animal received at a destination may be compared to the animals disposed in the shipping carton or other enclosure.

The condition of at least one animal at the destination, and the stress levels experienced during transportation, may be deduced.

The risk that an animal having the wrong characteristic, or not intended to be packaged and transported is reduced.

Variations and/or modifications may be made to the embodiments described without departing from the spirit or ambit of the invention. For example, the data store may comprise a plurality of files, each for a single animal and comprising animal identification information, mass information indicative of the mass of the animal, and optionally enclosure information indicative of the identity of the animal's enclosure. While in the described embodiments the animals in an enclosure are weighed by difference, each animal may be weighed individually before being placed in an enclosure, or generally by any suitable weighing technique. Radio frequency connectors may be SMA, SMB, type N, or generally any suitable connectors. The network connectors may be RJ45, BNC, USB, FIREWIRE, THUNDERBOLT or generally any suitable type of connectors. The networks may generally be any suitable network as appropriate, including but not limited to IEEE 802.3 and variants thereof, IEEE 802.11 and variants thereof, SONNET, SDH, ATM, DUST, ZIGBEE, FIBRECHANNEL, USB, BLUETOOTH, FIREWIRE, and THUNDERBOLT. An enclosure may take any suitable form, including but not limited to cage, vivarium, terrarium, tank, shipping carton, container, and coop and may or may not have a closure. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A system for ascertaining a mass of a plurality of animals each having a radio frequency identification (RFID) tag, the system comprising:
    a scale configured to support one of the plurality of animals and generate weight information indicative of the mass of each of the plurality of animals weighing by difference each of the plurality of animals when so supported;
    a RFID reader configured to interrogate the RFID tag when each animal is so supported, and derive animal identification information indicative of an identity of the animal from the RFID tag when so interrogated; and
    a removable enclosure including an enclosure RFID tag, the removable enclosure configured to receive the plurality of animals one at a time when supported by the scale,
    wherein the RFID reader is operably coupled to the scale to receive the weight information indicative of the mass of each of the plurality of animals and is configured to interrogate and derive enclosure information indicative of an identity of the removable enclosure from the enclosure RFID tag, and is further configured to generate an electronic animal manifest to be stored in the enclosure RFID tag and includes at least the animal identification information indicative of the identity of each of the plurality of animals, the weight information indicative of the mass of each of the plurality of animals, and the enclosure information indicative of the identity of the removable enclosure.

2. The system defined by claim 1 wherein the scale comprises an electronic scale.

3. The system defined by claim 1 wherein the weight information indicative of the mass of each of the plurality of animals is generated by weighing by difference each of the plurality of animals as the plurality of animals are at least one of incrementally received by the removable enclosure supported by the scale and decrementally removed from the removable enclosure supported by the scale.

4. The system defined by claim 1 wherein the animal manifest is an electronic animal manifest stored in the enclosure RFID tag.

5. A method for ascertaining a mass of a plurality of animals each having a radio frequency identification (RFID) tag, the method comprising:
    generating weight information indicative of a mass of each of the plurality of animals with a scale; and
    interrogating the RFID tag of each of the plurality of animals to derive animal identification information indicative of an identity of the animal having that RFID tag,
    wherein the RFID tag of each of the plurality of animals are interrogated while the animal having that RFID tag is supported by the scale to derive animal identification information indicative of an identity of the animal having that RFID tag, and
    wherein the weight information indicative of the mass of each of the plurality of animals is generated by weighing by difference each of the plurality of animals as the plurality of animals are at least one of incrementally received by a removable enclosure supported by the scale and decrementally removed from the removable enclosure supported by the scale.

6. The method defined by claim 5 wherein the removable enclosure comprises an enclosure RFID tag that is interrogated to derive enclosure identification information indicative of an identity of the removable enclosure.

7. The method defined by claim 6 further comprising storing in an electronic data store at least one of the animal identification information indicative of the identity of the animal, the weight information indicative of the mass the animal, and the enclosure identification information indicative of the identity of the removable enclosure.

8. The method defined by claim 6 further comprising the step of a processor receiving the weight information indicative of the mass of each of the plurality of animals, the identity information indicative of the identity of each of the plurality of animals and the enclosure identity information indicative of the identity of the removable enclosure and generating an animal manifest for the removable enclosure comprising the animal identification information indicative of the identity of each of the plurality of animals and the weight information indicative of the mass of each of the plurality of animals.

9. A method for ascertaining a mass of a plurality of animals each having a radio frequency identification (RFID) tag, the method comprising:
    interrogating an enclosure RFID tag of a removable enclosure to derive enclosure identification information indicative of an identity of the removable enclosure;
    interrogating the RFID tag of each of the plurality of animals to derive animal identification information indicative of an identity of each of the plurality of animals;
    generating weight information indicative of a mass of the plurality of animals with a scale supporting at least one of the plurality of animals;
    receiving, by a processor, the weight information indicative of the mass of each of the plurality of animals, the identity information indicative of the identity of each of the plurality of animals and the enclosure identity information indicative of the identity of the removable enclosure; and
    generating, by the processor, an animal manifest for the removable enclosure comprising the animal identification information indicative of the identity of each of the plurality of animals and the weight information indicative of the mass of each of the plurality of animals,
    wherein the weight information indicative of the mass of each of the plurality of animals is generated by weighing by difference each of the plurality of animals as the plurality of animals are at least one of incrementally received by the removable enclosure supported by the scale and decrementally removed from the removable enclosure supported by the scale.

10. The method defined by claim 9 further comprising storing in an electronic data store the animal manifest.

11. The method defined by claim 10 wherein the electronic data store is the enclosure RFID tag.

* * * * *